United States Patent [19]
Carey

[11] Patent Number: 5,302,028
[45] Date of Patent: Apr. 12, 1994

[54] BATHTUB THERMOMETER DEVICE

[76] Inventor: Dianna M. Carey, R.R. 1, Box 78, Beardstown, Ill. 62618

[21] Appl. No.: 44,810

[22] Filed: Apr. 12, 1993

[51] Int. Cl.⁵ .................. G01K 1/14; G01K 11/00; G01K 5/72
[52] U.S. Cl. .................. 374/156; 374/162; 374/208; 374/206; 116/216; 116/221; 116/284; 340/586; 340/594
[58] Field of Search ............ 374/156, 162, 205, 206, 374/208, 207; 116/221, 216, 284; 340/594, 586

[56] References Cited

U.S. PATENT DOCUMENTS

| | | | |
|---|---|---|---|
| 1,595,738 | 8/1926 | Smith | 116/221 |
| 1,883,554 | 10/1932 | Chapman | 374/156 |
| 2,019,221 | 10/1935 | Hastings | 374/156 |
| 2,034,852 | 3/1936 | Wilhjelm | 374/156 |
| 2,048,512 | 7/1936 | Oakley | 116/221 |
| 2,310,503 | 2/1943 | Widmer | 116/221 |
| 2,590,276 | 3/1952 | Schwarz | 116/221 |
| 2,949,032 | 8/1960 | Bell | 374/156 |
| 3,086,399 | 4/1963 | Mertler et al. | 116/221 |
| 4,030,361 | 6/1977 | Fortune | 374/156 |
| 4,968,153 | 11/1990 | Stachoviak | 374/208 |

FOREIGN PATENT DOCUMENTS

| | | | |
|---|---|---|---|
| 0834349 | 11/1938 | France | 374/156 |
| 1514809 | 6/1978 | United Kingdom | 374/162 |

Primary Examiner—Diego F. F. Gutierrez
Attorney, Agent, or Firm—Leon Gilden

[57] ABSTRACT

A thermometer housing of a generally cylindrical configuration is arranged for floating reception within a bathtub, with the thermometer housing including a top wall divided into a first and second semi-annular indicator surface, with an indicator arrow operative through a bi-metallic spring arranged for deflection from the first to the second indicator surface upon bathtub water elevated to a second zone of temperature to be classified as inappropriate for bathing. A stabilizer weight member is mounted to the bottom wall to maintain alignment and emergence of the housing side wall within the associated bathtub body of water.

5 Claims, 4 Drawing Sheets ically 5,302,028

BATHTUB THERMOMETER DEVICE

BACKGROUND OF THE INVENTION

1. Field of the Invention

The field of invention relates to thermometer apparatus, and more particularly pertains to a new and improved bathtub thermometer device wherein the same is arranged for a floating positioning upon a body of water to provide for indication of appropriate or inappropriate temperature range for a bathing event.

2. Description of the Prior Art

Thermometer apparatus of various types have been utilized throughout the prior art relative to temperature indication relative to water, such as indicated in U.S. Pat. No. 3,952,594 wherein a thermometer device is mounted to a faucet, with a similar construction indicated in U.S. Pat. Nos. 3,960,016 and 5,076,709.

The instant invention attempts to overcome deficiencies of the prior art by providing for a device arranged for a floating positioning upon a body of water such as a bathtub to indicate appropriate or inappropriate water temperature for a bathing event and in this respect, the present invention substantially fulfills this need.

SUMMARY OF THE INVENTION

In view of the foregoing disadvantages inherent in the known types of thermometer apparatus now present in the prior art, the present invention provides a bathtub thermometer device wherein the same is arranged for flotation upon a body of water. As such, the general purpose of the present invention, which will be described subsequently in greater detail, is to provide a new and improved bathtub thermometer device which has all the advantages of the prior art thermometer apparatus and none of the disadvantages.

To attain this, the present invention provides a thermometer housing of a generally cylindrical configuration arranged for floating reception within a bathtub, with the thermometer housing including a top wall divided into a first and second semi-annular indicator surface, with an indicator arrow operative through a bi-metallic spring arranged for deflection from the first to the second indicator surface upon bathtub water elevated to a second zone of temperature to be classified as inappropriate for bathing. A stabilizer weight member is mounted to the bottom wall to maintain alignment and emergence of the housing side wall within the associated bathtub body of water.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bathtub thermometer device which has all the advantages of the prior art thermometer apparatus and none of the disadvantages.

It is another object of the present invention to provide a new and improved bathtub thermometer device which may be easily and efficiently manufactured and marketed.

It is a further object of the present invention to provide a new and improved bathtub thermometer device which is of a durable and reliable construction.

An even further object of the present invention is to provide a new and improved bathtub thermometer device which is susceptible of a low cost of manufacture with regard to both materials and labor, and which accordingly is then susceptible of low prices of sale to the consuming public, thereby making such bathtub thermometer devices economically available to the buying public.

Still yet another object of the present invention is to provide a new and improved bathtub thermometer device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
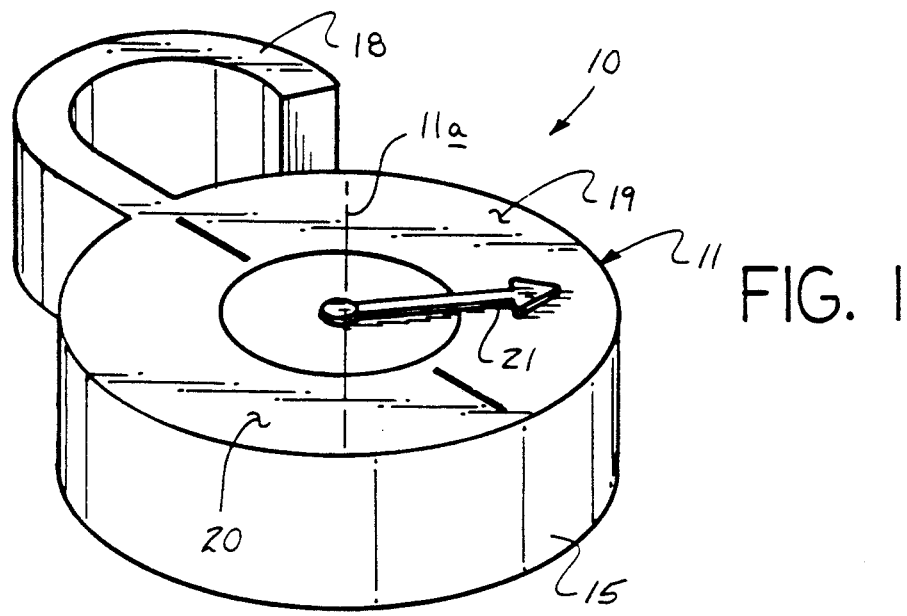
FIG. 1 is an isometric illustration of the invention.
Figure 2:
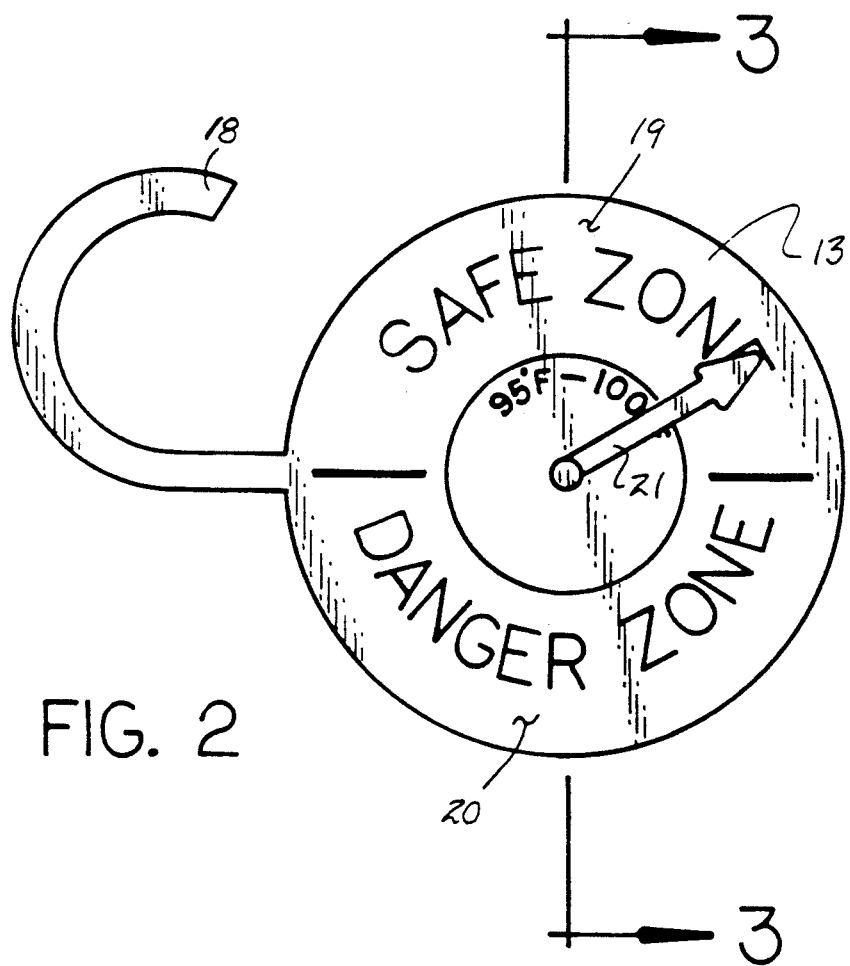
FIG. 2 is an orthographic top view of the invention.

With reference now to the drawings, and in particular to FIGS. 1 to 8 thereof, a new and improved bathtub thermometer device embodying the principles and concepts of the present invention and generally designated by the reference numerals 10, 10a, and 10b will be described.

More specifically, the bathtub thermometer device 10 of the instant invention essentially comprises a fluid impermeable enclosed housing 11 that is formed of a heat transmissible material, having an enclosed pneumatic chamber 12 therewithin. The housing 11 includes a housing top wall 13 spaced from a housing bottom wall 14 and a surrounding side wall 15, with a support hook 18 extending from the side wall for permitting support of the structure during periods of storage and non-use. An annular ring housing 16 is integral with the housing bottom wall 14 oriented in adjacency to the periphery of the bottom wall in adjacency to the side wall 15, such that the annular ring housing 16 projecting below the bottom wall 14 includes a counterweight ring 17 to afford stability to the structure within a body of water such as bathtub water, as well as to immerse the housing along the side wall to provide more of the housing structure in fluid communication with a surrounding body of water to enhance heat transmission therethrough into the heat indicator structure, to be described in more detail below. The annular ring housing 16 is positioned beyond the bottom wall 14 and fixedly secured to the bottom wall.

The top wall 13 includes a semi-annular first top wall indicator area 19 and a second top wall indicator area 20 of a semi-annular configuration such that typically, the first top wall indicator area 19 of a semi-circular configuration indicates water between ninety-five and one hundred degrees F. for example, wherein the indicator arrow leg 21 upon pivoting due to thermal sensing from the first indicator area 19 to the second indicator area 20 indicates an unsafe undesirable water temperature for a bathing event.

Figure 3:
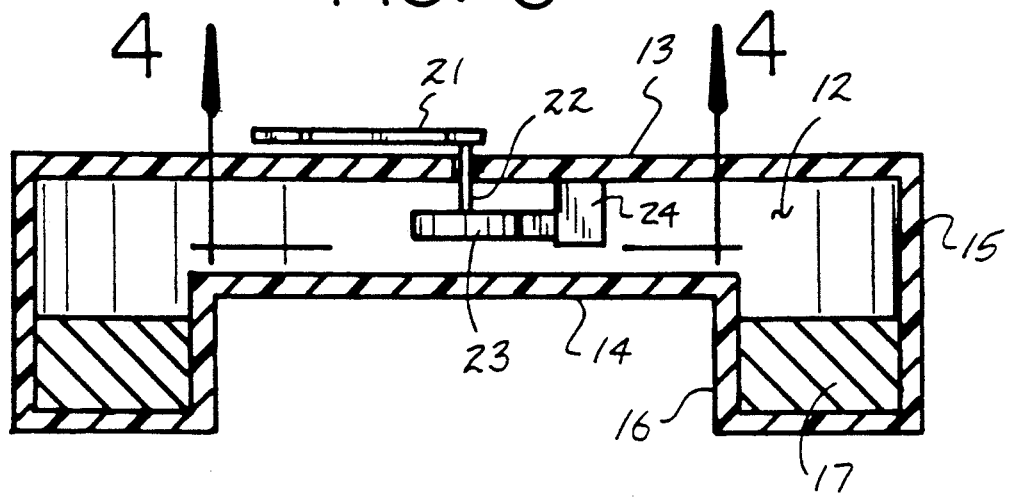
FIG. 3 is an orthographic view, taken along the lines 3—3 of FIG. 2 in the direction indicated by the arrows.
Figure 4:
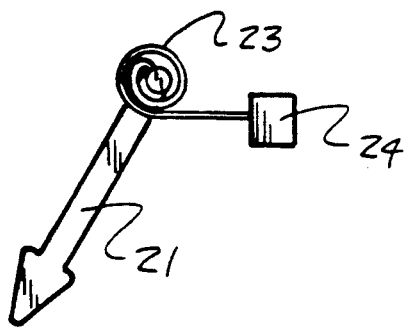
FIG. 4 is an orthographic top view of the indicator arrow structure.

The indicator arrow leg 21 is mounted about an indicator axle 22 that is coaxially aligned and positioned within the housing 11 extending orthogonally through the top wall 13 mounting the indicator arrow leg 21 thereon exteriorly of the housing 11. A bi-metallic spring 23 is mounted to the indicator axle 22 within the housing 11 at a first end of the bi-metallic spring 23, with a second end of the bi-metallic spring 23 mounted to a support boss 24 fixedly secured within the pneumatic chamber 12, such as to the top wall 13, as indicated in FIG. 3 for example.

Figure 5:
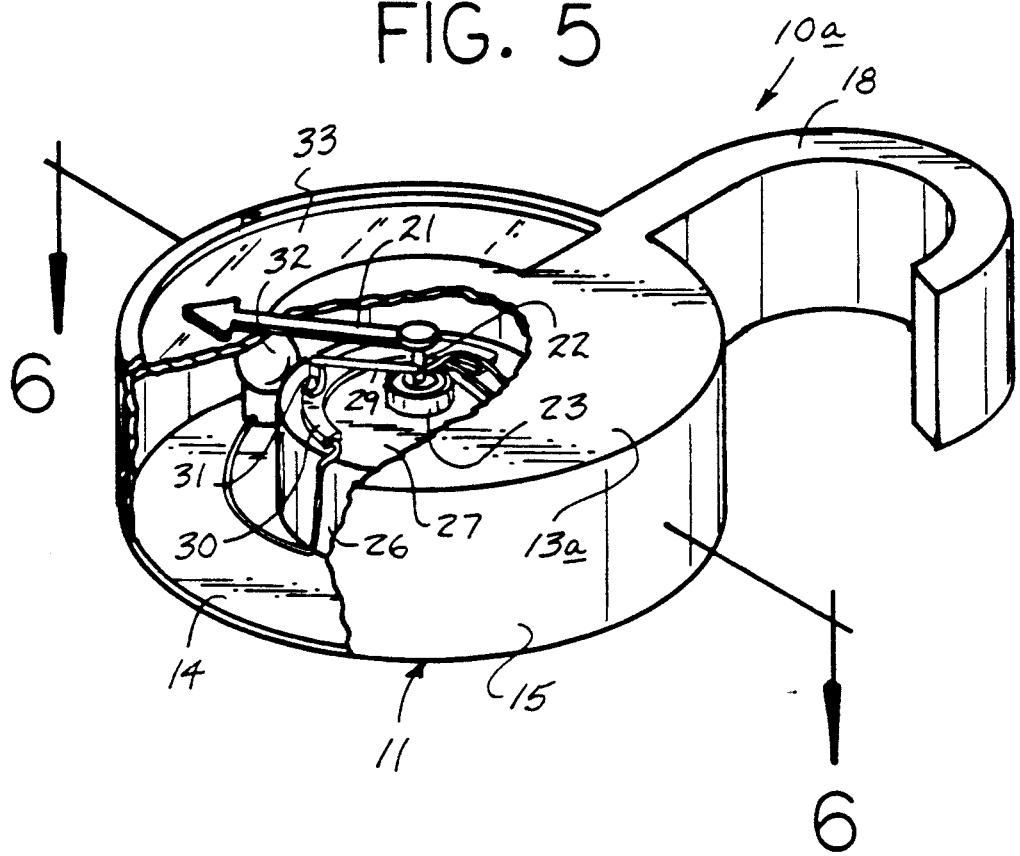
FIG. 5 is an isometric illustration, partially in section, of a modified apparatus of the invention.
Figure 6:
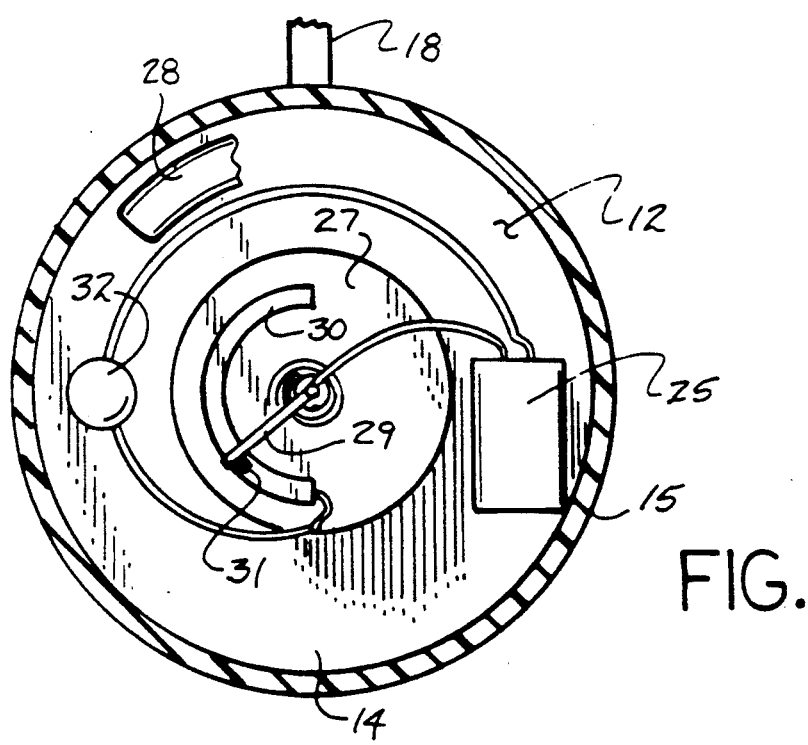
FIG. 6 is an orthographic view, taken along the lines 6—6 of FIG. 5 in the direction indicated by the arrows.

The apparatus 10a, as indicated in the FIGS. 5 and 6, further includes a support housing 26 mounted coaxially within the pneumatic chamber 12 onto the bottom wall 14, with the support housings 26 including a support housing top wall 27 oriented in a parallel relationship relative to and between the top and bottom walls 13 and 14. A battery 25 is positioned within the chamber 12 between the support housing 26 and the side wall 15, having a battery counterweight 28 positioned within the chamber 12 to offset an imbalance within the chamber due to the battery structure 25. A contact leg 29 is provided in fixed orthogonal mounting relative to the support axle 22, with the contact leg 29 oriented parallel to the indicator arrow leg 21 between the indicator arrow leg and the support housing top wall 27. The contact leg 29 includes a slide contact 31 arranged for sliding communication with an arcuate contact plate 30 that is fixedly mounted to the support housing top wall 27, with the contact plate 30 arranged in a concentric orientation relative to the housing 11 and oriented in a coextensive relationship below the semi-annular first top wall indicator area 20 positioned an equal distance relative to the axle 22, as is the contact plate 30, such that the arcuate contact plate 30 effects electrical communication between the battery 25 and an illumination bulb 32 positioned within the housing below the second top wall indicator area 20 and further below a transparent arcuate window 33 to indicate illumination to enhance visual observation of an inappropriate water temperature when the slide contact 31 is in communication with the arcuate contact plate 30 to function as a switch assembly to effect illumination of the illumination bulb 32.

Figure 7:
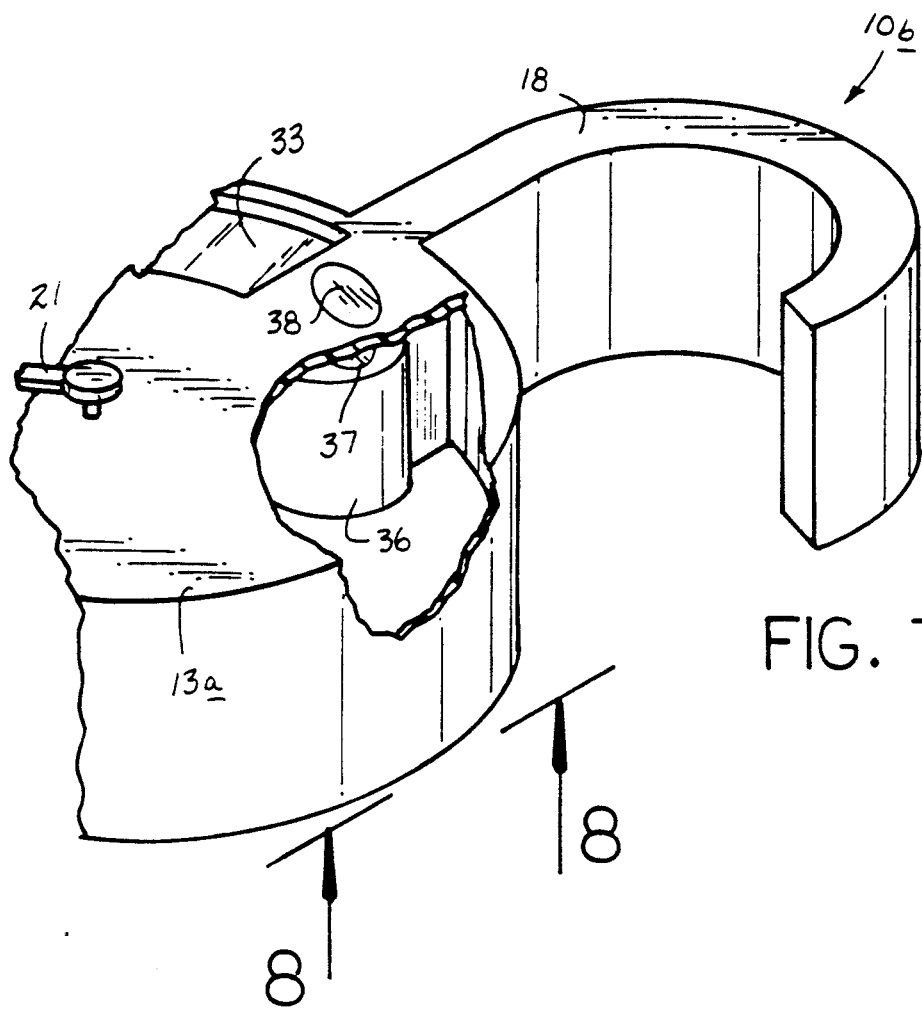
FIG. 7 is an isometric partial view of a further modified aspect of the invention.
Figure 8:
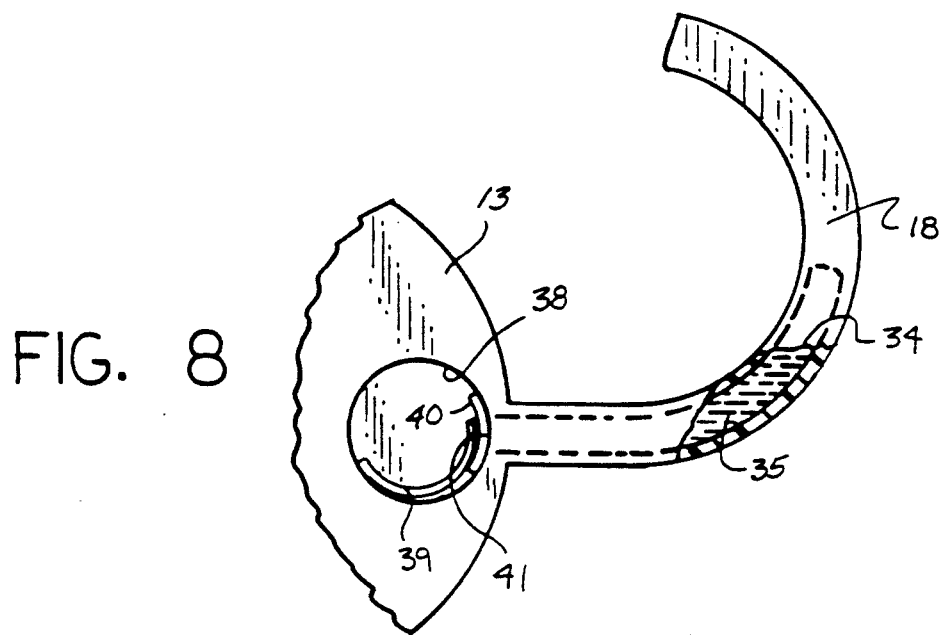
FIG. 8 is an orthographic view, taken along the lines 8—8 of FIG. 7 in the direction indicated by the arrows.

The apparatus 10b, as indicated in the FIGS. 7 and 8, further includes the support hook 18 having a hook cavity reservoir 34, including a fluid dye 35 therewithin in fluid communication with an indicator housing 36. The indicator housing 36 includes an indicator housing window 37, with a top wall window 38 directed through the top wall 13 aligned with the indicator housing window 37. A bi-metallic gate spring 39 mounted within the indicator housing 36 and to a gate flange 40 effects sealing of the hook cavity reservoir 34 from the indicator housing 36 until such time as a detrimental temperature is reached, wherein the bi-metallic gate spring 39 displaces the gate flange 40 permitting fluid flow of the fluid dye 35 from the hook cavity reservoir 34 through the reservoir entrance 41 into the indicator housing 36, whereupon that dye of a contrasting coloration relative to water for example is visible through the top wall window 38 and the indicator housing window 37. Further it should be noted that the top wall window 38 may be configured as a magnification lens to enhance visual observation of the fluid dye when received within the indicator housing 36 to further enhance visual observation of a detrimental temperature range.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A bathtub thermometer device, comprising,
   a housing member having an enclosed pneumatic chamber coextensive with the housing member, the housing member including a top wall spaced from a bottom wall and a side wall, with the top wall, the bottom wall, and the side wall symmetrically oriented about a housing axis, and
   a support hook fixedly mounted to the side wall, and temperature sensing means contained within the pneumatic chamber, having an indicator arrow leg mounted to the temperature sensing means, with the indicator arrow leg positioned exteriorly of the housing member in a parallel spaced relationship relative to the top wall for visually indicating ambient temperature relative to the housing member, and
   the top wall includes a semi-annular first top wall indicator area, and a semi-annular second top wall indicator area for cooperation with the indicator arrow leg, and the temperature sensing means includes an indicator axle fixedly mounted to the indicator arrow leg in an orthogonal relationship, with the indicator axle coaxially aligned with the housing axis, and a bi-metallic spring mounted to the indicator axle, with the bi-metallic spring including a support boss fixedly securing the bi-metallic spring within the pneumatic chamber, and
   the bottom wall includes an annular ring housing positioned beyond the bottom wall and fixedly mounted to the bottom wall concentrically oriented relative to the housing axis, and wherein the annular ring housing includes a counterweight member directed coextensively throughout the annular ring housing.

2. A device as set forth in claim 1 wherein the pneumatic chamber includes a support housing fixedly mounted to the bottom wall, having a support housing top wall spaced from and parallel to the housing member top wall, with the support housing top wall including an arcuate contact plate concentric relative to the housing axis and coextensive relative to the second top wall indicator area, with the indicator axle including a contact leg fixedly mounted to the indicator axle, with the contact leg oriented in a parallel relationship relative to and between the support housing top wall and the housing member top wall, with the contact leg including a slide contact arranged for electrical communication with the arcuate contact plate, and an illumination bulb mounted within the pneumatic chamber between the housing bottom wall and the second top wall indicator area, and a battery member positioned within the pneumatic chamber, and a battery counterweight positioned within the pneumatic chamber for balancing the battery and the illumination bulb within the housing member, whereupon rotation of the indicator axle directs the slide contact in communication with the arcuate contact plate to effect illumination of the illumination bulb.

3. A device as set forth in claim 2 with a transparent arcuate window directed through the second top wall indicator area coextensive with the second top wall indicator area and with the arcuate window concentric relative to the housing axis and positioned between the second top wall indicator area and the arcuate contact plate.

4. A device as set forth in claim 3 wherein the support hook includes a hook cavity reservoir containing a fluid dye, with the pneumatic chamber including an indicator housing in fluid communication with the hook cavity reservoir through a reservoir entrance, with a gate flange mounted in a first position in sealing communication with the reservoir entrance and displaceable to a second position permitting fluid flow of the fluid dye from the hook cavity reservoir through the reservoir entrance, with a bi-metallic gate spring mounted to the gate flange maintaining the gate flange in the first position and upon elevated ambient heating of the housing member, the bi-metallic gate spring is arranged to displace the gate flange to a second position displaced relative to the reservoir entrance, and the hook cavity reservoir including a housing window, and the housing member top wall having a top wall window coaxially aligned with the reservoir housing window.

5. A device as set forth in claim 4 wherein the top wall window is a magnification lens.

* * * * *